(12) United States Patent
Baggett (10) Patent No.: US 8,160,973 B2
(45) Date of Patent: Apr. 17, 2012

(54) TECHNIQUE FOR PRODUCING CONSTRUCTED FARES

(75) Inventor: David M. Baggett, Hermosa Beach, CA (US)

(73) Assignee: Google Inc., Mountain View, CA (US)

( * ) Notice: Subject to any disclaimer, the term of this patent is extended or adjusted under 35 U.S.C. 154(b) by 3423 days.

(21) Appl. No.: 09/877,159

(22) Filed: Jun. 8, 2001

(65) Prior Publication Data

US 2002/0052854 A1  May 2, 2002

Related U.S. Application Data

(63) Continuation of application No. 09/272,437, filed on Mar. 19, 1999, now Pat. No. 6,263,323.

(51) Int. Cl.
  *G06F 17/00* (2006.01)
(52) U.S. Cl. ........................................... 705/400
(58) Field of Classification Search ................. 705/1, 5, 705/6, 400
  See application file for complete search history.

(56) References Cited

U.S. PATENT DOCUMENTS

| | | | | |
|---|---|---|---|---|
| 4,758,954 A | * | 7/1988 | Takiguchi | 705/13 |
| 5,021,953 A | * | 6/1991 | Webber et al. | 705/6 |
| 5,255,184 A | * | 10/1993 | Hornick et al. | 705/6 |
| 5,270,921 A | * | 12/1993 | Hornick | 705/6 |
| 5,331,546 A | * | 7/1994 | Webber et al. | 705/6 |
| 5,459,667 A | * | 10/1995 | Odagaki et al. | 701/209 |
| 6,192,314 B1 | * | 2/2001 | Khavakh et al. | 701/209 |
| 6,263,323 B1 | * | 7/2001 | Baggett | 705/400 |
| 2002/0178034 A1 | * | 11/2002 | Gardner et al. | 705/5 |

FOREIGN PATENT DOCUMENTS

| | | | |
|---|---|---|---|
| EP | 0762306 A2 | * | 3/1977 |
| JP | 12-20590 A | * | 1/2000 |
| WO | WO 92/12492 | * | 7/1992 |
| WO | WO 99/01822 | * | 1/1999 |

OTHER PUBLICATIONS

"Ticket for Mass Transit System"; IBM Technical Disclosure Bulletin, Jul. 1, 1975, vol. 18, No. 2, pp. 553-554.*
Hamzaee et al: "An applied model of airline revenue management"; Journal of Travel Reasearch, v35 n4 Spring 1997, pp. 64-68.*
"Expedia, Inc. Reports Record Secord Quarter Financial Results"; PR Newswire Jan. 31, 2000; p. 8575.*
"Expedia, Inc. Reports Record Third Quarter Pro Forma Results"; PR Newswire May 1, 2000.*
Airline Tariff Publishing Company Construction Manual May 22, 1995.*
"Construction Processing Logic", *Automated Fare Construction User Guide*, pp. 14-20.
"Construction Processing Logic", *Airline Tariff Publishing Company*, Sep. 15, 1994, pp. 1-3.
"Construction Processing Logic", Apr. 9, 1992, pp. 1-4.
"Data Application Constructed Fares", Version 1.0, ATPCO, May 18, 2001, pp. B1-B106.

* cited by examiner

*Primary Examiner* — Dennis Ruhl
(74) *Attorney, Agent, or Firm* — Fish & Richardson P.C.

(57) ABSTRACT

A technique for producing constructed fares that include an arbitrary added to a published fare is described. The techniques determine interior cities that appear with gateway cities in arbitraries for the airline and searches for gateway cities corresponding to the determined interior cities appearing in the arbitraries. The technique applies an arbitrary corresponding to one of the interior cities to a published fare involving one of the gateway cities to produce the constructed fare.

4 Claims, 8 Drawing Sheets

TECHNIQUE FOR PRODUCING CONSTRUCTED FARES

This application is a continuation of application Ser. No. 09/272,437 filed on Mar. 19, 1999 now U.S. Pat. No. 6,263,323.

This invention relates to a process for producing constructed fares.

Airlines publish fares for various markets. A market is a city pair such as NYC-PAR (New York-Paris). For markets involving major cities like the NYC-PAR market, airlines provide published fares, that is, stated prices for travel between the two cities. For markets involving minor cities, however, the airlines rely on a process called fare construction to produce fares that are sometimes called "constructed fares." Fare construction is particularly used for minor markets involving international travel.

In the NYC-PAR market there may be hundreds of published fares with corresponding rules to combine the fares. However, there are too many markets for airlines to actually publish fares for every single market. For example, for the OME-NCE (Nome, Alaska/Nice, France) market, there may not be a published fare because the Nome-Nice market may be too small for airlines to actually publish fares. Nevertheless, the airlines need to be able to offer some price for an OME-NCE ticket. The fare construction process solves this problem by providing a mechanism to "extend" a published fare with add-ons also called arbitraries, in order to derive prices to minor cities. An arbitrary, like a published fare, lists two cities. However, unlike cities in a published fare (which establish a bidirectional market), the cities in an arbitrary are ordered: the first is the gateway (or major) city, and the second is the interior (or minor) city. Constructed fares can be either two-component constructed fares, i.e., one arbitrary combined with one published fare or three-component constructed fares, i.e., two arbitraries combined with one published fare. Examples of two-component constructed fares include OME-NYC arbitrary+NYC-PAR fare=OME-PAR fare NYC-PAR fare+PAR-NCE arbitrary=NYC-NCE fare As the examples show, the arbitrary can be added to either end of the published fare. A three-component constructed fare is shown below, where arbitraries are added to both sides of the published fare OME-NYC arbitrary+NYC-PAR fare+PAR-NCE arbitrary=OME-NCE fare In general, two-component constructed fares provide prices between a minor city and a major city, while three-component constructed fares provide prices between two minor cities.

One approach used to fare construction is to use a list of constructed fares called "The Unpublished Fares Product" that is available from Airline Tariff Publishing Company (ATPCO). ATPCO is an intermediary that maintains fares published by airlines and resellers. With "The Unpublished Fares Product" a cross-product of all arbitraries and all base fares is determined and provided into a list. That list can contain millions of constructed fares.

In addition, there are rules that govern the fare construction process, many of which date back to times when fare construction was performed by hand on paper. In particular, not all arbitraries can combine with all fares; various table-driven compatibility checks are performed to verify that a particular combination is acceptable.

SUMMARY

According to an aspect of the present invention, a method of producing constructed fares that includes an arbitrary added to a published fare is provided. The method is executed in a computer system and the method includes determining interior cities that appear with gateway cities in arbitraries for the airline, searching for gateway cities corresponding to the determined interior cities appearing in the arbitraries and applying an arbitrary corresponding to one of the interior cities to a published fare involving one of the gateway cities to produce the constructed fare.

According to a further aspect of the present invention, a method of producing a set of constructed international fares for an airline is executed in a computer system and includes determining interior cities that appear with gateway cities in arbitraries for the airline, searching for gateway cities corresponding to the determined interior cities appearing in the arbitraries and applying each arbitrary corresponding to each of the determined interior cities to published fares involving the gateway cities to produce the set of constructed fares.

According to a further aspect of the present invention, a computer program product resides on a computer readable medium for producing constructed fares that includes an arbitrary added to a published fare. The computer program product includes instructions for causing a computer system to determine interior cities that appear with gateway cities in arbitraries for the airline, search for gateway cities corresponding to the determined interior cities appearing in the arbitraries and apply an arbitrary corresponding to one of the interior cities to a published fare involving one of the gateway cities to produce the constructed fare.

According to a further aspect of the present invention, a computer program product for producing a set of constructed international fares for an airline resides on a computer readable medium and includes instructions that cause a computer to determine interior cities that appear with gateway cities in arbitraries for the airline, search for gateway cities corresponding to the determined interior cities appearing in the arbitraries and apply each arbitrary corresponding to each of the determined interior cities to published fares involving the gateway cities to produce the set of constructed fares.

According to a further aspect of the present invention, a computer system includes a processor and a memory for storing instructions executed by the processor. The system also includes a storage medium storing a computer program product for producing a set of constructed international fares for an airline. The computer program product includes instructions that cause the processor to determine interior cities that appear with gateway cities in arbitraries for the airline, and search for gateway cities corresponding to the determined interior cities appearing in the arbitraries. The program also includes instructions that cause the processor to apply each arbitrary corresponding to each of the determined interior cities to published fares involving the gateway cities to produce the set of constructed fares.

One or more of the following advantages may be provided from one or more aspects of the invention. The fare construction process produces "constructed fares" in a computational efficient manner. The fare construction process dynamically produces constructed fares. That is, because of the efficiency of the algorithm the fare construction process can produce constructed fares on an "as needed basis", using the most current information such as currency conversion factors, prices, fares, and fare construction tables. The fare construction process produces two and three component constructed fares. The fare construction process produces the fares efficiently, since although the process is quadruple-nested, branching factors at each loop level are generally small, because there are relatively few gateway cities for a given interior city.

BRIEF DESCRIPTION OF THE DRAWINGS

The foregoing features and other aspects of the invention will be described in further detail by the accompanying drawings, in which.

DESCRIPTION

Figure 1:
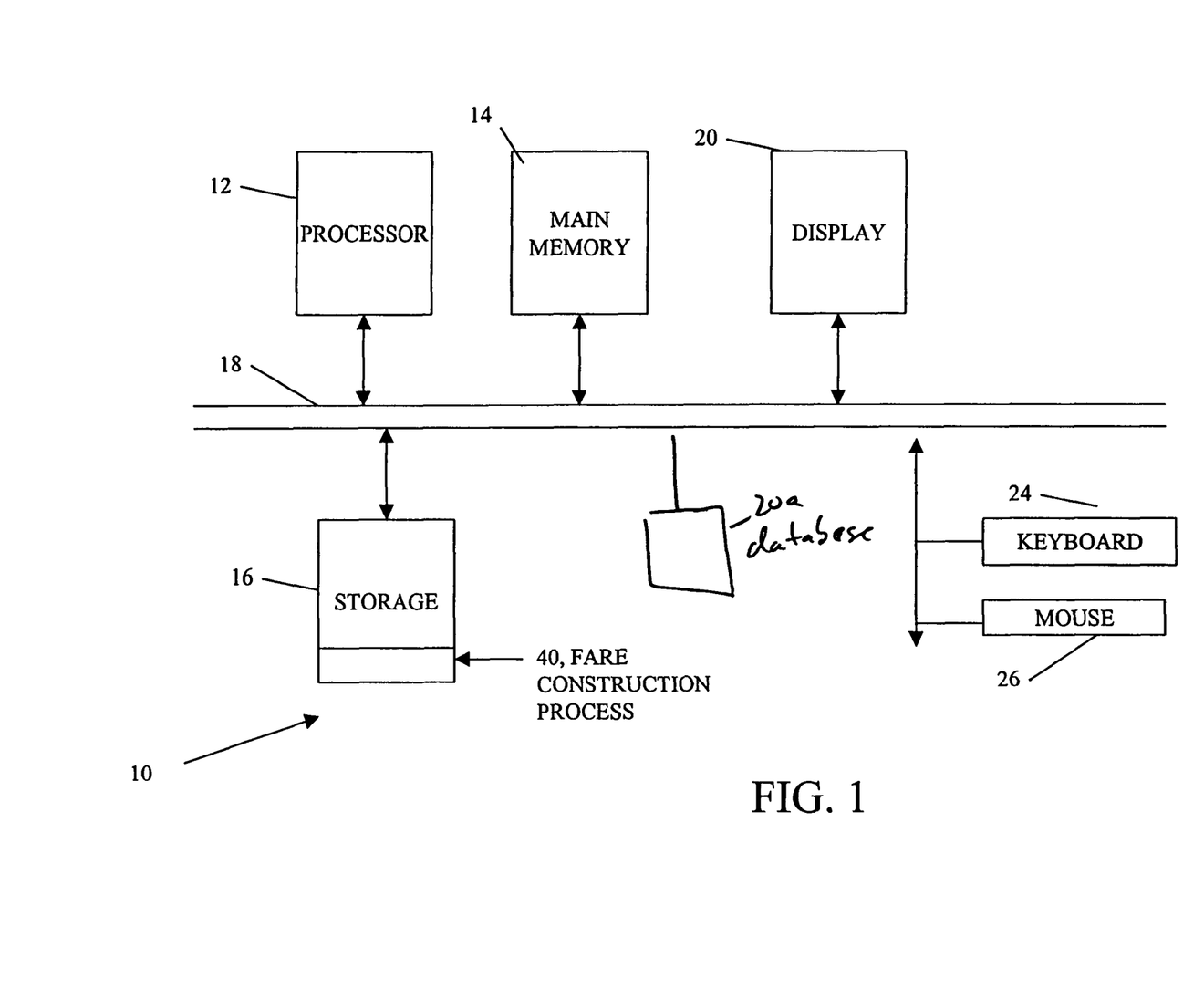
FIG. 1 is a block diagram of a computer system having a fare construction process to produce constructed fares.

Referring now to FIG. 1, a computer system 10 includes a CPU 12, main memory 14 and persistent storage device 16 all coupled via a computer bus 18. The system 10 also includes output devices such as a display 20 and a printer (not shown), as well as user input devices such as a keyboard 24 and a mouse 26. Not shown in FIG. 1, but would necessarily be included in a system of FIG. 1, are software drivers and hardware interfaces to couple all the aforementioned elements to the CPU 12.

The computer system 10 also includes a fare construction process 40 that produces constructed fares generally between international origins and destinations of travel. The fare construction process 40 may reside on the computer system 10 or may reside on a server, not shown, in a conventional manner such as in a client-server arrangement.

The fare construction process 40 can be used as part of a travel planning system. The fare construction process 40 can access a database 20a. The database 20a can store the Airline Tariff Publishing Company database of published airline fares and construction tables. The database 20a can be stored locally and updated periodically by accessing a remote resource (not shown) that maintains the database.

One approach to produce a large number of constructed fares can generate a list, and generally a complete list, of all possible constructed fares. This process could be based on an algorithm that forms all legal combinations of all arbitraries with all published fares and stores them in a table of fares. One way of doing this would use an algorithm that loops for each airline for each of four cities as shown below.

```
loop: for each airline a,
    loop: for each city, c1
        loop: for each city, c2
            loop: for each city, c3, try to construct fares for airline a,
            c1-c2-c3
                loop: for each city, c4, try to construct fares for airline
                a, c1-c2-c3-c4
```

This process is not efficient because there are far too many cities to make this a practical approach. Assume there are 1000 cities with airports, (there are actually far more than that), then the running time of this process is proportional to $1000^4$ or some one trillion determinations. This may be far too many determinations for even the fastest computers particularly if it is necessary to have access to the most current information to produce a constructed fare implying that the process should be run on as needed basis.

Referring now to FIGS. 2A-2D, preprocessing 30 to pre-compute 32 a first hash table 37a to produce a list 38a of gateway cities {C2} (FIG. 2B), to precompute 34 a second hash table 37b to produce a second list 38b of gateway cities {C3} (FIG. 2C), and to precompute 36 a third hash table 37c to produce a list 38a of interior cities {C4} (FIG. 2D) is shown. The first hash table 37a is constructed 32 such that when the fare construction process accesses the table by an (airline, interior-city) pair the hash table 37a returns in constant time, the list 38a of gateway cities {C2} for which an airline "A" has arbitraries that specify the interior city C1. The second hash table 37b is constructed such that when the fare construction process accesses the second hash table 37b by an (airline, gateway) pair the table returns the list 38b of gateway cities {C3} that the airline "A" publishes fares from the specified gateway C2 to another gateway city C3. The third hash table 37c is constructed 36 such that when the fare construction process accesses the table by an (airline-gateway pair) the hash table 37c returns, the list 38c of interior cities {C4} for which an airline "A" has arbitraries that specify the gateway city C3. These hash tables are used by the fare construction process 40 (FIGS. 3A-3B) or 40' (FIGS. 4A-4C), as described below.

Figure 2A:
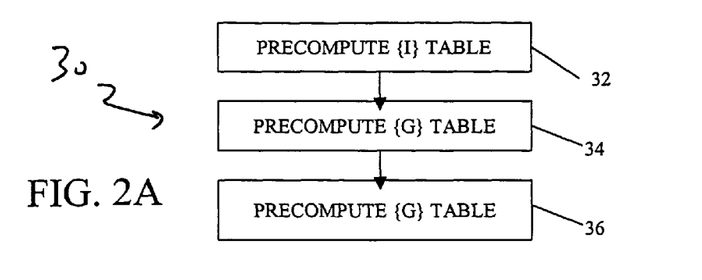
FIGS. 2A-2D are block diagrams showing use of hash tables used to store data for use by the fare construction process.
Figure 2B:
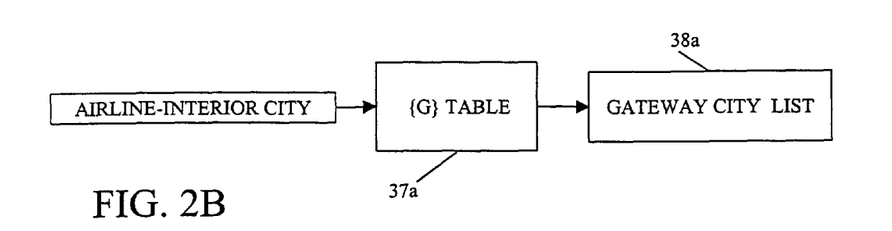

The first hash table 37a is produced 32 by iterating over all arbitraries. For each arbitrary A, a hash table entry H for the arbitrary A's interior city is located (or produced, if it does not exist). The arbitrary A's gateway city is added to a hash table entry H gateway city list. A gateway city entry in the gateway city list indicates that it is possible to use an arbitrary to get from A's interior to A's gateway city. Once all arbitraries have been processed this way, duplicates are removed from all the lists of gateway-cities.

Figure 2C:
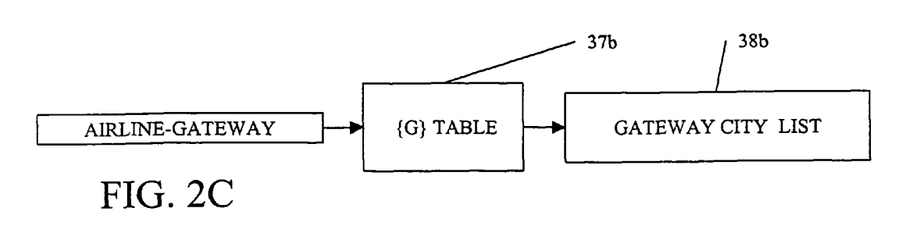

The second hash table 37b is produced 34 in a similar manner. The difference is that the process to produce 34 the second hash table iterates over the set of all international published fares rather than the set of all arbitraries.

Figure 2D:
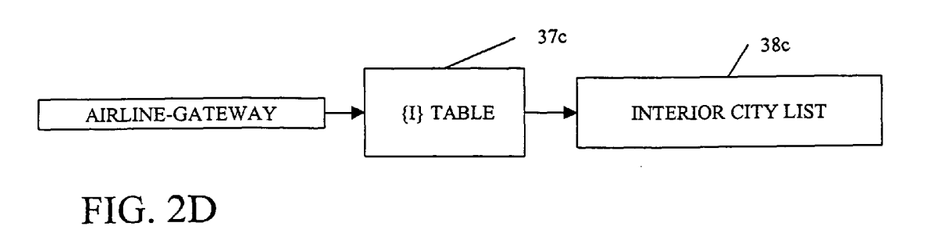

The third hash table 37c is produced 36 by iterating over all arbitraries. For each arbitrary A, a hash table entry H for the arbitrary A's gateway city is located (or produced, if it does not exist). The arbitrary A's interior city is added to a hash table entry H interior city list. An interior city entry in the interior city list indicates that it is possible to use an arbitrary to get from A's gateway to A's interior city. Once all arbitraries have been processed this way, duplicates are removed from all the lists of interior-cities.

Producing the hash tables is quite efficient. The process that produces the hash tables can run in a time that is proportional to the number of arbitraries for the first table 37a and third table 37c or the number of fares for second table 37b. Once the hash tables 37a, 37b, 37c have been produced, they only need to be modified during the fare construction process if there is a change (i.e., addition or removal) in arbitraries or gateway cities. Thus, in general, the hash table production process is a small, one-time fixed cost.

Figure 3A:
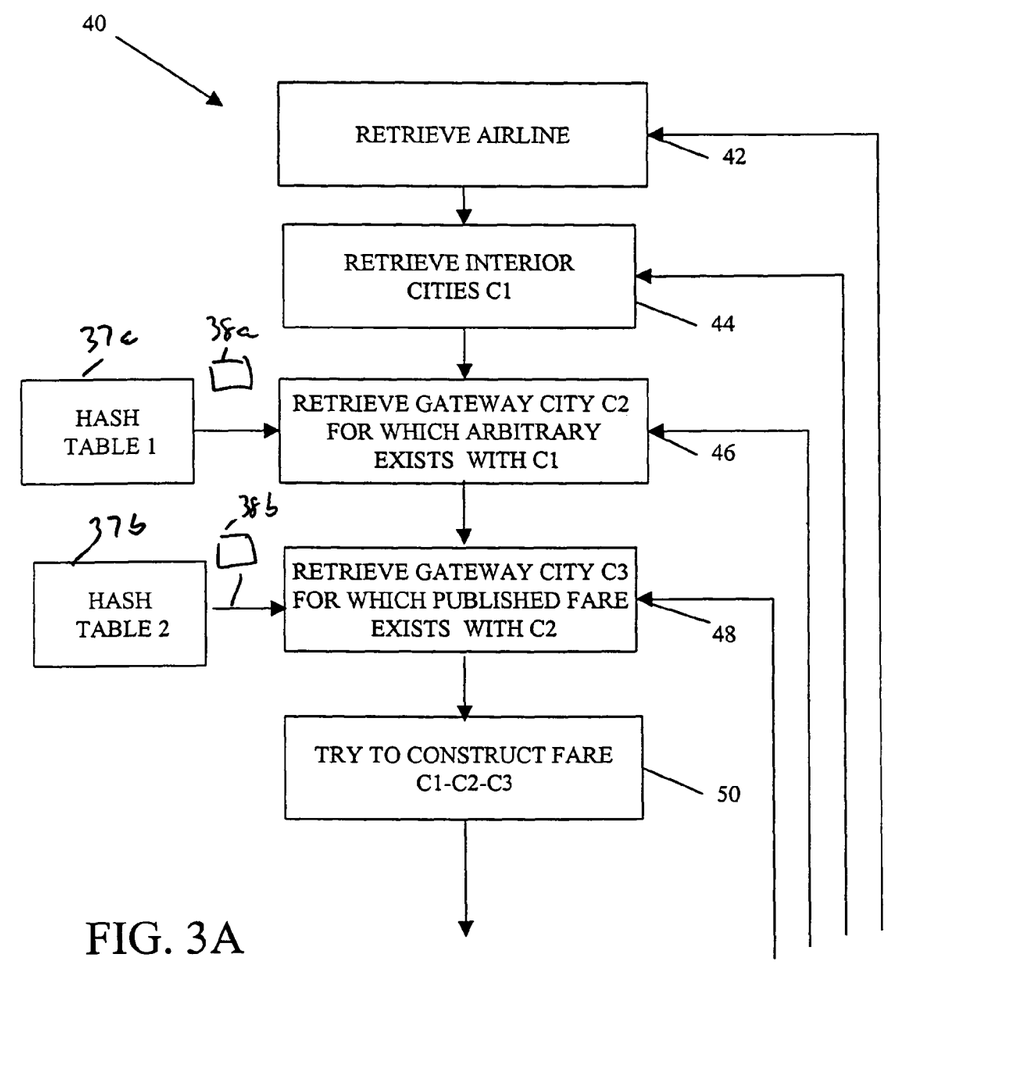
FIGS. 3A-3B are flow charts showing a fare construction process used in the system of FIG. 1 to produce two component constructed fares.
Figure 3B:
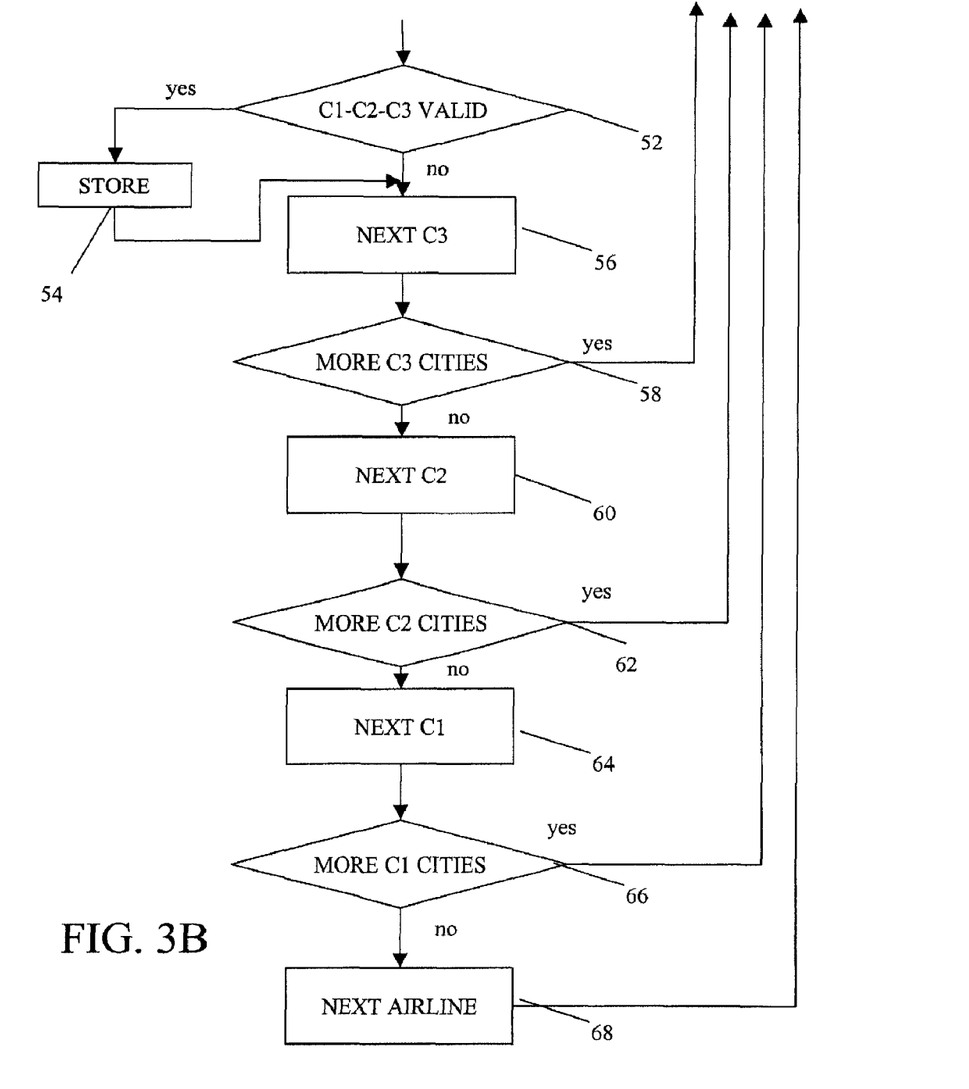

Referring now to FIGS. 3A-3B, a fare construction process 40 that produces "constructed fares" in a computational efficient manner is shown. The fare construction process 40 produces two component constructed fares for the airlines. A process to produce two and three component constructed fares is described in conjunction with FIGS. 4A-4C.

This fare construction process 40 makes the computation process more efficient since it takes into consideration that very few cities are actually part of arbitraries. In other words, the complete set of arbitraries on all carriers only covers a small portion of the total set of cities. One key to rapidly enumerating constructed fares, therefore, is to start only with interior cities known to appear in some arbitraries. In addition, this algorithm also takes into consideration that there is no need to consider all cities in the world for the gateway cites. Rather, it is only necessary to consider those cities as gateways if the city is involved in some arbitrary whose interior city is the city currently being examined in the process.

Pseudocode for the fare construction process 40 would be:

```
loop: for each airline a,
   loop: for each city, c1, the interior city in some arbitrary for airline a,
      loop: for each city, c2, for which some arbitrary c1-c2 exists
      for airline a,
         loop: for each city, c3, for which some published fare c2-c3
         exists for airline a,
            try to construct fares for airline a, c1-c2-c3
```

The fare construction process 40 determines 42 constructed fares for each airline "A." The fare construction process 40 only considers fares from the same airline since international fare combining rules generally prohibit combining fares from different airlines. In general, currently the airline codes must be an exact match. However, if the rules were to change to allow affiliates or airlines that have the same corporate parent to be used to construct fares, the process could be modified to take this into consideration. For example, the hash table could include the affiliates or other airline in the hash tables and return them in the lists when accessed by the system. The fare construction process 40 eliminates many impossible combinations. That is, if the fare construction process 40 is producing constructed fares for a given airline it does not matter if fares can be constructed with other airlines. This recognition significantly limits the number of usable gateways for any given airline and significantly speeds up the process.

The fare construction process 40 retrieves 44 an interior city from a list of interior cities "C1" that are part of an arbitrary for the airline "A." The fare construction process 40 retrieves 46 a city C2 from the list 38a (via an access to the first hash table 37a) of all of the cities "C2" that form arbitraries C1-C2 for city "C1" for airline "A." The constructed fares process 30 retrieves 48 from the list 38b (via an access to the second hash table 38a) a city "C3" that forms a published fare with city "C2" for airline "A." The fare construction process 40 tries 50 to produce a constructed fare for the C1-C2-C3 city combinations. This embodiment of the fare construction process 40 produces the two-component constructed fares, i.e., one arbitrary combined with one published fare.

The fare construction process 40 will determine 52 if the C1-C2-C3 constructed fare is valid. If it is valid it is stored 54 or otherwise noted, and then a pointer (not shown) is incremented to get the next C3 city 56. If there are more C3 cities 58, the fare construction process will retrieve 48 the next gateway city C3 for which a published fare exists with C2 that is all of the cities that form a published fare with gateway city C2 and the fare construction process 40 will continue. If all cities C3 have been tested, it will then retrieve the next C2 city 60 by incrementing another pointer (not shown) to get the next C2 city. If there are more C2 cities 62, the fare construction process 40 will retrieve 46 the next gateway city C2 for which an arbitrary exists with city C1 and the fare construction process 40 will continue.

If all C2 cities have been tested, it will then retrieve the next C1 city 64 by incrementing another pointer (not shown) to get the next C1 city 44. If there are more C1 cities, the fare construction process will retrieve the next interior city C1 will continue. If all interior cities C1 have been tested, it will then retrieve the next airline 68 by incrementing another pointer (not shown) to get the next airline.

Figure 4A:
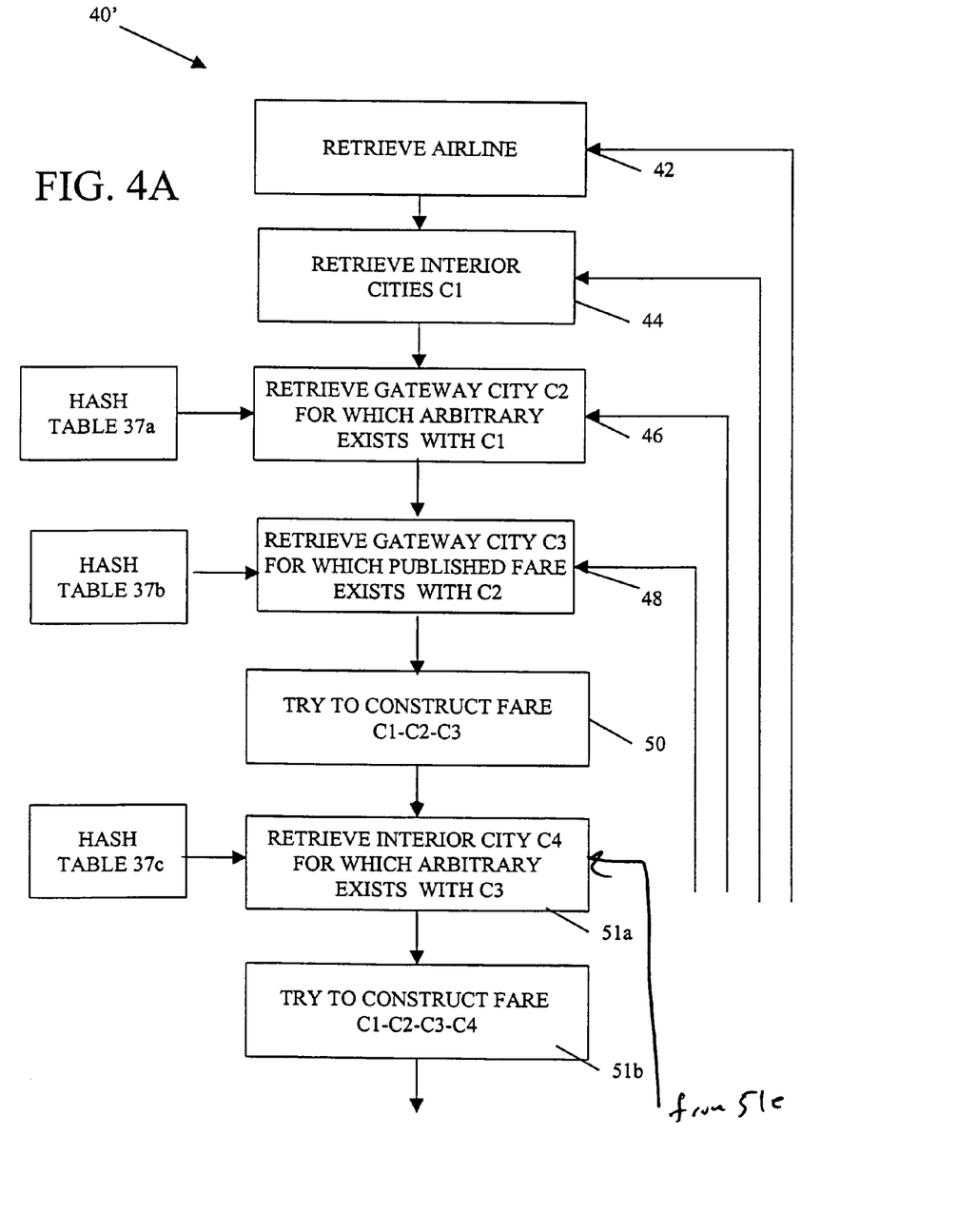
FIGS. 4A-4C are flow charts showing a fare construction process used in the system of FIG. 1 to produce two and three component constructed fares.
Figure 4B:
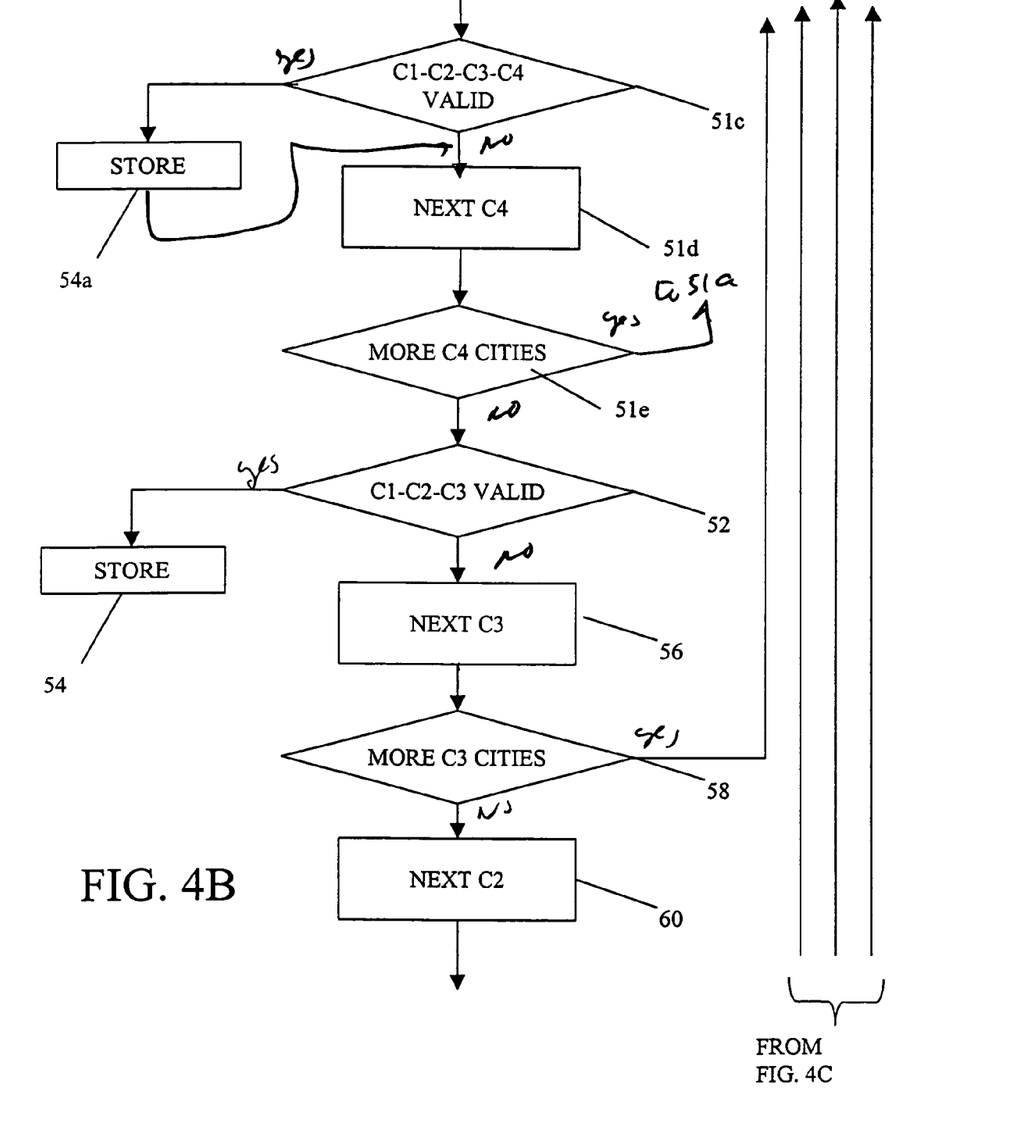
Figure 4C:
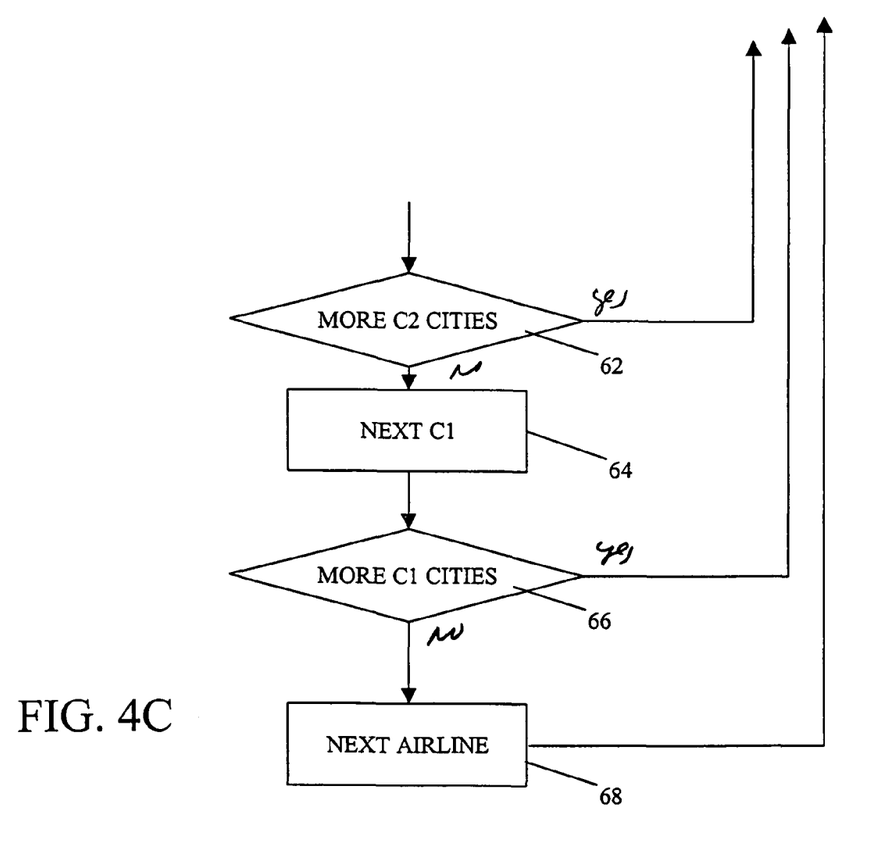

Referring now to FIGS. 4A-4C, a fare construction process 40' to construct two and three-component constructed fares, i.e., two arbitraries combined with one published fare is shown. In the embodiment 40', there is an additional loop. The fare construction process 40' is similar to the process 40 up to when the fare construction process tries 50 to construct a two-component constructed fare. Thus, the fare construction process 40' uses processes 42, 44, 46, 48 as well as 52, 54, 56, 58 and 60, 62, 64, 66 and 68 of FIGS. 3A-3B. The fare construction process 40' retrieves 51a a second interior city C4 from a list of interior cities "C4" that are part of an arbitrary that exists for city C3 for the airline "A." The fare construction process 40 retrieves 51a a city C4 from the list 38c (via an access to the third hash table 37c) of all of the cities "C4" that form arbitraries C3-C4 for gateway city "C3" for airline "A." The fare construction process 40' tries 51b to produce a constructed fare for the C1-C2-C3-C4 city combinations. The fare construction process 40 will determine 51c if the C1-C2-C3-C4 constructed fare is valid. If it is valid it is stored 54a or otherwise noted, and then a pointer (not shown) is incremented to get 51d the next C4 city. If there are more C4 interior cities 51e, the fare construction process 40' will retrieve the next interior city C4 and the fare construction process will continue. If all cities C4 have been tested, it will continue from testing 52 the C1-C2-C3 two component constructed fare as described above. This embodiment 40' produces two-component and three-component constructed fares, i.e., two arbitraries combined with one published fare.

Pseudocode for the fare construction process 40' is:

```
loop: for each airline a,
   loop: for each city, c1, the interior city in some arbitrary for airline a,
      loop: for each city, c2, for which some arbitrary c1-c2 exists
      for airline a,
         loop: for each city, c3, for which some published fare
         c2-c3 exists for airline a,
            try to construct fares for airline a, c1-c2-c3
            loop: for each city, c4, for which some arbitrary
            c3-c4 exists for airline a,
               try to construct fares for airline a,
               c1-c2-c3-c4
```

The fare construction process 40' produces the fares efficiently, since although the process is still quadruple-nested, branching factors at each loop level are generally small, because there are relatively few gateway cities for a given interior city. So, although the running time is still proportional to $k^4$, the value of k at any level is typically k=10-20 instead of k=1000.

The fare construction process 40 or 40' produces these fares dynamically. That is, because of the efficiency of the algorithm the fare construction process 40 or 40' can produce constructed fares on an as needed basis using the most current information such as currency conversion factors, prices, fares, and construction tables.

A valid constructed, international fare can have either one or two arbitraries. Current ATPCO rules permit one arbitrary and one base fare or two arbitraries and a base fare. The ATPCO rules do not permit more than two arbitraries. The fare construction process 40 finds those interior cities that, for a given airline, are part of an arbitrary. For those interior cities, the fare construction process 40 uses as potential gateways those cities for which it is a gateway city in some arbitrary with those interior cities, rather than using every possible airport as a gateway. With the selected lists of potential gateways and arbitraries, the fare construction process 40 tries to form a constructed fare. This fare construction process 40 involves forming a cross product of all of the cities C1, C2, and C3 and testing the resulting constructed fare against fare rules to see if it is a valid constructed fare.

For any city, there is a manageable number of arbitraries, e.g., 0.1 to 10 s for example. Therefore, given such a set there is a manageable number of cities that are involved in an arbitrary. The fare construction process 40 therefore constructs fares by examining a small number of gateways and arbitraries for only those gateways. Thus, this fare construction process 40 can construct all potential constructed fares throughout the whole world on all airlines.

Trying to construct a fare for a city combination involves evaluating the constructed fares against fare rules. Although, these rules are extensive, the process described herein makes use of several approaches that speed up aspects of the rule evaluation process. The fare construction process 40, 40' (FIGS. 3A-3B and 4A-4C) is governed by a set of tables called fare construction tables. One of these tables includes a list of so called "PO2" records. The PO2 list of records is maintained by ATPCO from information set by airlines. The PO2 list of records is a set of rules that specify how fares can be combined with arbitraries. Each airline places its entries in the PO2 list of records. The PO2 list of records exist so that any fare that the airline publishes will not automatically combine with any arbitrary that the airline publishes. For example, a very cheap fare may not be combinable with an arbitrary that can reach a luxury destination. The PO2 list of records control this process by limiting what base fares an arbitrary can combine with.

The PO2 list of records are structured for each fare on a carrier and is specific to a market. For example, on a New York to London fare, the PO2 list of records will govern what arbitrary classes the New York to London fare may combine with.

When the airline fare construction process 40 or 40' produces combinations of city pairs before actually producing a constructed fare from a published fare and one or two arbitraries, the fare construction process 40 determines if it is a valid combination. One check that is performed is against PO2 records.

Figure 5:
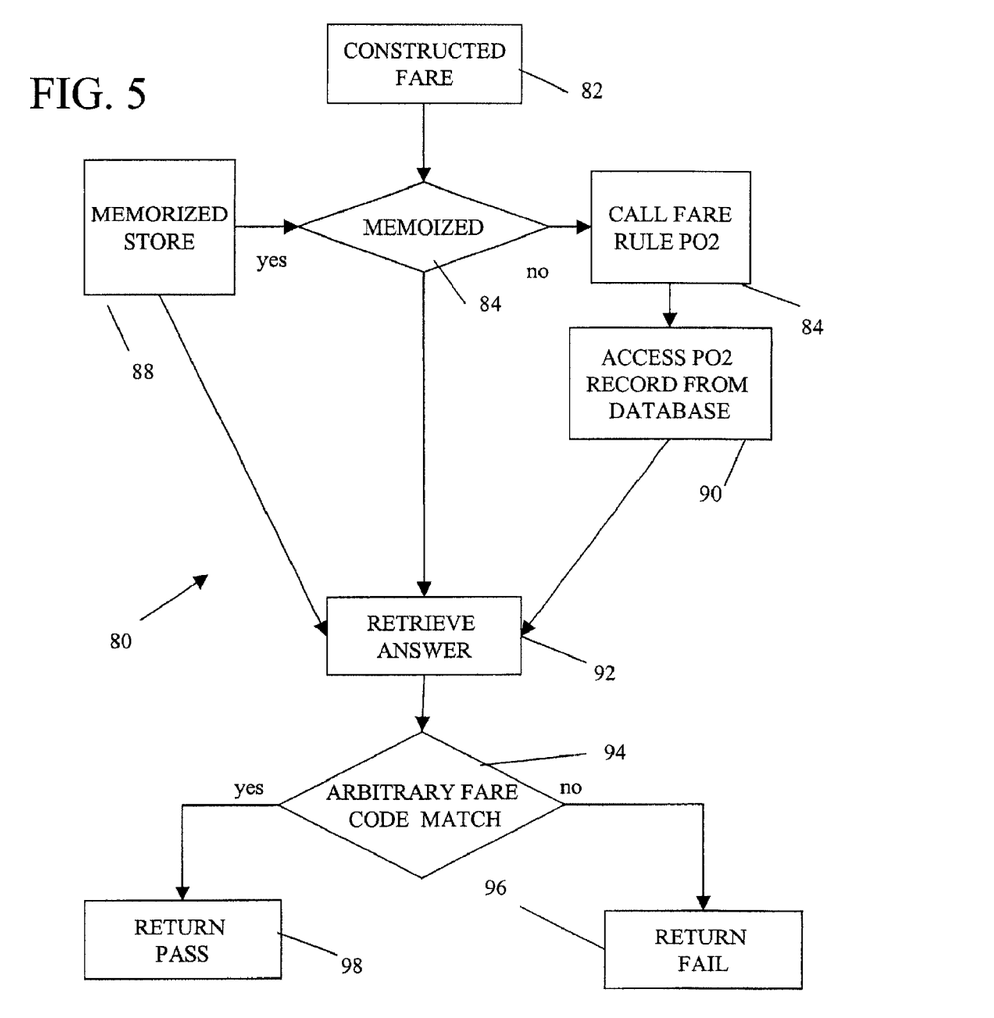
FIG. 5 is a flow chart showing use of a memoization process for rule retrieval.

Referring to FIG. 5, in determining whether or not a fare can combine with an arbitrary 94, the fare construction process 40 checks the "PO2" records corresponding to the fare 96. If the PO2 records do not list the arbitrary's fare code, the arbitrary cannot combine with the fare, and the construction is prohibited. Otherwise, the fare construction process 40 returns a pass 98. The conventional process of finding the set of PO2 records matching a particular fare is time consuming. Alternatively, the check of fare construction tables can be done on a batch basis after all potential constructed fare combinations have been determined.

To save time when constructing large numbers of fares, a PO2 procedure retrieval 80 uses a process called memoization. Memoization is a technique for speeding up certain kinds of algorithms. If an expensive procedure is called many times, and if the procedure's output depends only on the input (i.e., the answer is not dependent on any external factors, such as the current time), then memoization can be used. To memoize PO2 retrieval, the PO2 procedure call 80 forms a query 82 involving the constructed fare. The memoization retrieval process 80 has a store 88 of past queries and associated answers. If the memoization retrieval process 80 determines 84 that the query has been stored, it is retrieved from the store 92. Otherwise, a procedure call 86 for the PO2 record is produced and used to access 90 the record from a remote database. The answer from the remote database is stored 92 in the memoization store 88 for future references.

For subsequent calls for the record, the output from the memoization store 88 is used in response to a retrieval query for the PO2 records as it is called on every different input. That is, once the output for a certain input has been stored (i.e., the procedure has been called on that input once), the procedure does not need to be run again on that input. For the next call to the procedure on that input, the value is simply looked up in the memoization table. Because the PO2 matching process needs to be run many times for a single fare, memoization also improves performance.

The construction tables also include so-called PO4 records. These also limit which fares can combine with which arbitraries, and also require a non-trivial lookup process. In some cases, memoization of the PO4 record lookup process also improves performance. Memoization can be used with other non-trivial rule retrievals when testing fares.

The fare construction process 40' (FIGS. 4A-4C) efficiently enumerates all possible constructed fares. The fare construction process 40' can be modified to generate subsets of constructed fares. Exemplary subsets are all of the constructed fares on a specific airline or all of the constructed fares through a particular gateway. The fare construction process 40' can be modified to include conditional statements such as "if . . . then" clauses into the fare construction process 40'. For example, to limit construction to one airline R, the second loop 44 of the process can include a condition, like:

```
loop: for each airline a,
    if (a = R)
        loop: for each city, c1, the interior city in some arbitrary for
        airline a,
        ..
``` where "R" is a code for a specific airline. The modification will produce only fares for the airline specified by "R".

The other loops can be similarly conditioned. In general, the process can be modified to produce fares matching this pattern:

cxr interior1 gateway1 gateway2 interior2 fare-basis components where any combination of these elements can be allowed to vary, and where "cxr" is an airline code, "interior1" is the first interior city in a constructed fare, "gateway1" is the first gateway city in a published fare, "gateway2" is the second city in the published fare, "interior2" is the second city in a constructed fare, "fare-basis" is a one to eight character code or name of a fare type, and "components" is the number of fare components, i.e., two or three. For example, calling the algorithm with the setting UA OME <any><any>NCE <any><any> will produce all United Airlines constructed fares from Nome to Nice via any gateways, with any fare basis, and with any number of components (two or three).

Pseudocode for the algorithm modified to support these options follows.

```
loop: for each airline a,
if cxr = <any>, or cxr = a then
  loop: for each city, c1, the interior city in some arbitrary for airline a,
  if interior1 = <any>, or interior1 = c1 then
    loop: for each city, c2, for which some arbitrary c1-c2 exists for
    airline a,
    if gateway1 = <any>, or gateway1 = c2 then
      loop: for each city, c3, for which some published fare c2-c3 exists
      for airline a,
      if gateway2 = <any>, or gateway2 = c3 then
      try to construct fares for airline a, c1-c2-c3, and store in array X
      if fare-basis /= <any> then
      remove fares from X not matching fare-basis
      if components = <any> or components = 2 then
      emit fares remaining in X
      if components = <any>, or components = 3 then
        loop: for each city, c4, for which some arbitrary c3-c4 exists for
        airline a,
          if interior2 = <any> or interior2 = c4 then
          try to construct fares for airline a, c1-c2-c3-c4 and store in
          array Y
          if fare-basis /= <any> then
          remove fares from Y not matching fare-basis
          emit fares remaining in Y
```

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of producing a constructed fare that includes an arbitrary added to a published fare, said method executed in a computer system having memory and a persistent storage device, the method comprising:
    preprocessing by:
        determining interior cities that appear with gateway cities in arbitraries for an airline, the arbitraries being published amounts and an ordered set of two cities that extend published fares that include an amount for travel between two cities to provide a bi-directional market; and
        searching a database having published fares for gateway cities corresponding to the determined interior cities appearing in the arbitraries; and
        producing the constructed fare, by:
            applying an arbitrary corresponding to one of the interior cities to a published fare involving one of the gateway cities that corresponds to the determined interior cities appearing in the arbitraries to produce a constructed fare; and
            storing the constructed fare in memory or the persistent storage device of the computer system for use in travel planning, faring and/or pricing; and
        wherein applying an arbitrary further comprises:
    evaluating records from fare construction tables to determine whether the constructed fare is a valid constructed fare; and
    wherein testing entries further comprises:
        determining if an entry in a construction table was memoized before accessing the construction table; and
        if the entry was memoized, retrieving an answer from a store of memoized entries to apply to the constructed fare.

2. A method of producing a set of constructed international fares for a particular airline, the method executed in a computer system and the method comprising:
    preprocessing by:
        determining interior cities that appear with gateway cities in arbitraries for the particular airline, arbitraries being published amounts and an ordered set of two cities that extend published fares that include an amount for travel between two cities to provide a bi-directional market; and
        searching a database for gateway cities corresponding to the determined interior cities appearing in the arbitraries; and
    producing the constructed fares by:
        applying arbitraries corresponding to the determined interior cities to published fares involving the gateway cities that corresponds to the determined interior cities appearing in the arbitraries to produce the set of constructed fares for the airline; and
        storing the constructed fares in memory or the persistent storage device of the computer system for use in a travel related activity; and
    evaluating entries in fare construction tables to determine whether constructed fares in the set of constructed fares are valid constructed fares; and
    returning the valid constructed fares as the set of constructed fares;
    wherein evaluating entries further comprises:
        determining if an entry in a fare construction table was memoized before accessing the fare construction table; and
        if the entry was memoized, retrieving an answer from a store of memoized entries to apply to the constructed fare.

3. A computer program product residing on a computer readable medium, for producing constructed fares that includes an arbitrary added to a published fare, comprising instructions for causing a computer system to:
    preprocess data to determine interior cities that appear with gateway cities in arbitraries for the airline, arbitraries being published amounts and an ordered set of two cities that extend published fares that include an amount for travel between two cities to provide a bi-directional market;
    search for gateway cities corresponding to the determined interior cities appearing in the arbitraries;
    produce the constructed fare by applying an arbitrary corresponding to one of the interior cities to a published fare involving one of the gateway cities that corresponds to the determined interior cities appearing in the arbitraries to produce the constructed fare; and
    store the constructed fare in a computer readable medium for use in a travel related activity;
    wherein instructions that cause a computer to apply arbitraries further comprises instructions that cause a computer to test entries in construction tables to determine whether the constructed fare is a valid constructed fare;
    wherein instructions that cause a computer to test entries further comprises instructions that cause a computer to:
    determine if an entry in a construction table was memoized before accessing the construction table; and if the entry was memoized, retrieve an answer from a store of memoized entries to apply to the constructed fare.

4. A computer program product for producing a set of constructed international fares for an airline, the computer program product residing on a computer readable medium and comprising instructions that cause a computer to:

preprocess data by instructions to:

determine interior cities that appear with gateway cities in arbitraries for the airline, arbitraries being published amounts and an ordered set of two cities, that extend published fares that include an amount for travel between two cities to provide a bi-directional market;

search for gateway cities corresponding to the determined interior cities appearing in the arbitraries; and produce fares by instructions to:

apply each arbitrary corresponding to each of the determined interior cities to published fares involving the gateway cities that corresponds to the determined interior cities appearing in the arbitraries to produce the set of constructed fares; and store the constructed fares to a computer memory or persistent storage for use in a travel related activity; and further comprising instructions that cause a computer to:

evaluate entries in fare construction tables to determine whether constructed fares in the set of constructed fares are valid constructed fares; and return the valid constructed fares as the set of constructed fares;

wherein instructions that cause a computer to evaluate entries further comprises instructions that cause a computer to:

determine if an entry in a fare construction table was memoized before accessing the fare construction table; and if the entry was memoized, retrieve an answer from a store of memoized entries to apply to the constructed fare.

\* \* \* \* \*

UNITED STATES PATENT AND TRADEMARK OFFICE
CERTIFICATE OF CORRECTION

| | | |
|---|---|---|
| PATENT NO. | : 8,160,973 B2 | Page 1 of 1 |
| APPLICATION NO. | : 09/877159 | |
| DATED | : April 17, 2012 | |
| INVENTOR(S) | : Baggett | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3027 days.

Signed and Sealed this
Twenty-eighth Day of August, 2012

David J. Kappos
*Director of the United States Patent and Trademark Office*